(12) United States Patent
Morabia et al.

(10) Patent No.: US 11,394,923 B2
(45) Date of Patent: Jul. 19, 2022

(54) EMBEDDING CONTENT OF INTEREST IN VIDEO CONFERENCING

(71) Applicant: Avaya Inc., Santa Clara, CA (US)

(72) Inventors: Erez Morabia, Holon (IL); Gilad Levi, Yavne (IL); Shlomi Hofman, Petach-Tikva (IL); Mark Appel, Rishon Lezion (IL); Tamar Barzuza, Tel Aviv (IL)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 16/402,973

(22) Filed: May 3, 2019

(65) Prior Publication Data

US 2019/0260965 A1 Aug. 22, 2019

Related U.S. Application Data

(63) Continuation of application No. 15/286,285, filed on Oct. 5, 2016, now Pat. No. 10,321,096.

(51) Int. Cl.
*H04N 7/14* (2006.01)
*H04N 7/15* (2006.01)
(Continued)

(52) U.S. Cl.
CPC ......... *H04N 7/152* (2013.01); *H04L 65/1089* (2013.01); *H04L 65/1093* (2013.01); *H04L 65/403* (2013.01)

(58) Field of Classification Search
CPC ................ G06F 15/1822; G06F 15/25; G10L 2203/04804; G10L 3/04842;
(Continued)

(56) References Cited

U.S. PATENT DOCUMENTS 6,801,663 B2 10/2004 Matsushita et al.
8,341,665 B2 * 12/2012 Atsmon ............. H04N 21/4524
725/34
(Continued)

FOREIGN PATENT DOCUMENTS

WO     WO 00/75801     12/2000

OTHER PUBLICATIONS

"UStream," Ustream, Inc. 2014, retrieved from https://web.archive.org/web/20141231005210/www.ustream.tv/, 4 pages.
(Continued)

*Primary Examiner* — Binh Kien Tieu
(74) *Attorney, Agent, or Firm* — Sheridan Ross P.C.

(57) ABSTRACT

A video- and/or audio-enabled communication system includes a processor, coupled with a camera, the camera acquiring an image of an object of interest during a video communication session involving multiple participants and a computer readable medium comprising instructions that cause the processor to perform automatically an action in response to and related to a sensed context during the video communication session. The action can be one or more of retrieve or provide content of interest to one or more of the participants, join a third party to the video communication session, recommend that a further action be performed by the processor, and schedule an activity involving one or more of the participants.

20 Claims, 7 Drawing Sheets

(51) Int. Cl.
    *H04L 65/403*     (2022.01)
    *H04L 65/1093*     (2022.01)
    *H04L 65/1089*     (2022.01)

(58) Field of Classification Search
    CPC .............. G06Q 10/0637; G06Q 30/02; G06Q 30/0255; G06T 11/60
    USPC ........... 381/14.01, 14.07, 14.08, 14.09, 14.1, 381/14.12, 14.15
    See application file for complete search history.

(56) References Cited

U.S. PATENT DOCUMENTS

| | | | | |
|---|---|---|---|---|
| 8,539,027 | B1* | 9/2013 | Chen | G06Q 50/01 709/204 |
| 8,812,358 | B2* | 8/2014 | Tirpak | G06Q 30/0601 705/14.4 |
| 8,842,158 | B2 | 9/2014 | Sellers-Blais | |
| 9,025,752 | B2* | 5/2015 | Blewett | H04M 3/42221 379/202.01 |
| 9,432,517 | B2* | 8/2016 | Youel | H04M 3/56 |
| 10,321,096 | B2* | 6/2019 | Morabia | H04N 7/152 |
| 2005/0144642 | A1 | 6/2005 | Ratterman | |
| 2007/0072564 | A1* | 3/2007 | Adams | G06F 21/6218 455/115.1 |
| 2009/0017853 | A1 | 1/2009 | Ozog et al. | |
| 2011/0251899 | A1* | 10/2011 | Proulx | H04M 1/724 705/14.64 |
| 2012/0158776 | A1 | 6/2012 | Howard et al. | |
| 2012/0306993 | A1 | 12/2012 | Sellers-Blais | |
| 2013/0027504 | A1 | 1/2013 | Zhang | |
| 2013/0297409 | A1* | 11/2013 | Jones | H04L 12/1827 705/14.45 |
| 2015/0235403 | A1 | 8/2015 | Schneider | |
| 2015/0296181 | A1* | 10/2015 | Sanso | H04N 7/15 348/14.08 |
| 2016/0360382 | A1* | 12/2016 | Gross | G06F 9/445 |
| 2016/0373571 | A1* | 12/2016 | Woolsey | H04M 1/72454 |
| 2018/0032997 | A1* | 2/2018 | Gordon | G06Q 30/0269 |
| 2018/0316890 | A1* | 11/2018 | Farrell | A63F 13/352 |
| 2018/0349389 | A1* | 12/2018 | Ferrydiansyah | G06Q 10/10 |
| 2019/0057298 | A1* | 2/2019 | Brown | G06N 3/008 |
| 2020/0135206 | A1* | 4/2020 | Hebert | G06Q 30/0631 |

OTHER PUBLICATIONS

Official Action for U.S. Appl. No. 15/286,285 dated Feb. 8, 2017 10 pages.
Official Action for U.S. Appl. No. 15/286,285 dated Jul. 6, 2017 19 pages.
Official Action for U.S. Appl. No. 15/286,285 dated Oct. 25, 2017 18 pages.
Official Action for U.S. Appl. No. 15/286,285 dated Apr. 5, 2018 21 pages.
Official Action for U.S. Appl. No. 15/286,285 dated Aug. 15, 2018 18 pages.
Notice of Allowance for U.S. Appl. No. 15/286,285 dated Jan. 30, 2019 11 pages.

* cited by examiner

EMBEDDING CONTENT OF INTEREST IN VIDEO CONFERENCING

CROSS-REFERENCE TO RELATED APPLICATIONS

This application is a continuation of U.S. patent application Ser. No. 15/286,285, filed Oct. 5, 2016, the disclosure of which is incorporated herein by reference.

FIELD

The disclosure relates generally to video communication and particularly to perform an action in response to sensed context in a video telecommunication session.

BACKGROUND

Video as a Service ("VaaS") delivers multiparty or point-to-point video conferencing capabilities over an IP network by a managed service provider. VaaS business models enable businesses to use cloud services for video conferencing with no requirement to host and maintain expensive appliances on premise and payment being made based on use. Some businesses are highly sensitive to pricing and might therefore value business models that reduce pricing even further relative to existing pricing models.

SUMMARY

These and other needs are addressed by the various embodiments and configurations of the present disclosure.

A video-enabled communication system can include:

a processor, coupled with a camera, the camera acquiring an image of an object of interest during a video communication session involving multiple participants; and a computer readable medium comprising a virtual assistant that causes the processor to perform automatically an action in response to and related to a sensed context during the video communication session.

The action can include retrieve or provide content of interest to one or more of the participants, join a third party to the video communication session, recommend that a further action be performed by the processor, schedule an activity involving one or more of the participants, a combination thereof, and the like.

The sensed context can be one or more of identity of one or more of the participants, spatial or logical location of one or more of the participants, which of the participants is an active speaker, the use of a predetermined word or phrase or electronic address by one or more of the participants during the video communication session, personal information of one or more of the participants, and a prior action performed by the processor in response to a sensed context of a prior communication session involving one or more of the participants.

The sensed context can include the use of a predetermined word or phrase or electronic address by one or more of the participants during the video communication session.

A content monitor can monitor communications between participants or by a participant with the processor during the video communication session to determine the content of interest.

The monitored communications can include audio and text communications.

The virtual assistant can include a chat bot, a graphically rendered avatar appearing in a designated portion of a display provided during the video communication session, a synthetically generated voice played through one or more speakers to one or more of the participants and wherein the processor presents content of interest during the video communication session to one or more of the participants, a combination thereof, and the like.

The virtual assistant can select which image or layout or layout configuration is displayed to local or remote participants during the video communication session.

The content can be advertising content received from a content source.

The processor can determine a value to the content source for the presentation of the advertising content to the participants during the video communication session.

The processor can determine the value based on one or more of duration of time that the advertising content is presented, number or locations of the participants, whether a representative of the content source joins the video communication session, prior sales history of the content source with an enterprise associated with the participants, subsequent sales by the content source with the enterprise, an area or size of a frame or subframe of the display used to display the advertising content, and a presentation mode of the processor to present the advertising content.

The value can offset a payment by the enterprise related to the purchase or use of the video-enabled communication system.

The system can perform real-time context analytics and determine (a) who is participating in the video conferencing session and (b) what they are talking about now. Such analytics can be done, for example, by face recognition, speech recognition, and other technologies.

The system can embed dynamically advertisement content according to the sensed context of the meeting. For example, several engineers during a video conferencing session discuss a hardware component from a vendor. The system can recognize the topic of discussion, and the virtual assistant can display an advertisement or literature during the meeting about the hardware component.

The system can include a user interface that enables using the advertisement during the video conferencing session by inviting a representative to join the meeting by video or chat. For instance, the group of engineers desires to ask a few questions on the vendor's hardware. By pressing a button, the participants could invite a representative of the vendor to join the meeting and answer their questions. Alternatively, they could initiate a chat with a human or virtual representative of the vendor, which will be performed in the meeting chat box.

The advertisement can be stored locally and popped up after the meeting is completed, either automatically or by user request.

The time to present the advertisement can be chosen by context analytics. For example, the time can be based on user profiles and in correlation with the contents of the video conferencing session. Other examples include time periods when no human participant is speaking, during intermission, prior to video conferencing start (e.g., in a waiting room or not), and the like.

Advertisement content can be displayed in many ways in a video conferencing session. A textual injection to the chat area can be done. The advertisement content can be embedded in the video stream, either in the participant layout or on top with some transparency level. For instance, the system can reserve one participant frame or subframe in the layout for advertisement that is based on conversation topics.

Once all participants are quiet, the advertisement frame or subframe can be emphasized, similar to an active speaker being emphasized while speaking. The participants can also request the system to present the advertisement content in a presentation mode, and by that to emphasize it even further for them to discuss.

The present disclosure can provide a number of other advantages depending on the particular configuration. The system can monitor and respond effectively, appropriately, and timely to the needs of participants, thereby enhancing meeting productivity and user experience. The use of credits can offset the pricing paid by businesses for video conferencing capabilities. Advertising content is embedded in the video stream of the video conferencing session in a way to benefit users without compromising user experience. Advertisement content can be displayed when relevant to the conversation (or in silent periods) and enable reaching out to representatives for further information. This can target highly relevant advertisement to the subject of the meetings and provide a user interface to leverage the advertisement content to obtain additional related information during the meeting. The use of embedded advertisement content in a VaaS business model, in particular, is economically advantageous for consumers.

These and other advantages will be apparent from the disclosure contained herein.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "biometric information" is any information that can be used in biometric verification to identify uniquely a selected person, including one or more distinguishing biological traits. Unique identifiers include, for example, fingerprints, hand geometry, a facial feature such as earlobe geometry, retina and iris patterns, and the like, voice waves, DNA, and signatures. Facial recognition, for example, can be used to biometrically verify a selected person's identity.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "electronic address" refers to any contactable address, including a telephone number, instant message handle, e-mail address, Universal Resource Locator ("URL"), Universal Resource Identifier ("URI"), Address of Record ("AOR"), electronic alias in a database, like addresses, and combinations thereof.

The term "face detection" refers to an algorithm for detecting a face of a subject in a captured image by applying digital image processing techniques to image information (either still or video frame). Such algorithms include the Viola-Jones face detection algorithm (which uses Haar feature selection, integral image creation, Adaboost training, and cascading classifiers to effect face detection) and implementations thereof (such as the MATLAB and OpenCV implementations of the algorithm), KLT algorithm (which acquires numerous feature points by first scanning the face; these points then may be detected and tracked even when the face is tilted or turned away from the camera) and implementations thereof, and other techniques known to those of skill in the art.

The term "facial recognition" or "face recognition" refers to an algorithm for identifying a person's identity based on a detected facial image of the person by applying digital image processing techniques to image information (either still or video frame). One of the ways to do this is by comparing selected facial features from the image and a facial database. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. Template matching techniques applies a template to a set of salient facial features, providing a compressed face representation. Recognition algorithms can be divided into two main approaches, geometric, which looks at distinguishing features, or photometric, which is a statistical approach that distills an image into values and compares the values with templates to eliminate variances. Common recognition algorithms can use Principal Component Analysis using eigenfaces, Linear Discriminate Analysis, Elastic Bunch Graph Matching using the Fisherface algorithm, the Hidden Markov model, the Multilinear Subspace Learning using tensor representation, the neuronal motivated dynamic link matching, SVM, maximal rejection classifier ("MRC"), and other techniques known to those of skill in the art.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "multipoint" conferencing unit refers to a device commonly used to bridge videoconferencing connections. The multipoint control unit can be an endpoint on a network that provides the capability for three or more endpoints and/or gateways to participate in a multipoint conference. The MCU includes a mandatory multipoint controller (MC) and optional multipoint processors (MPs).

The term "video" refers to any relevant digital visual sensory data or information, including utilizing captured still scenes, moving scenes, animated scenes etc., from multimedia, streaming media, interactive or still images etc.

The term "videoconferencing" refers to conduct of a videoconference (also known as a video conference or videoteleconference) by a set of telecommunication technologies which allow two or more locations to communicate by simultaneous two-way video and audio transmissions. It has also been called 'visual collaboration' and is a type of groupware. Videoconferencing differs from videophone calls in that it's designed to serve a conference or multiple locations rather than individuals.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
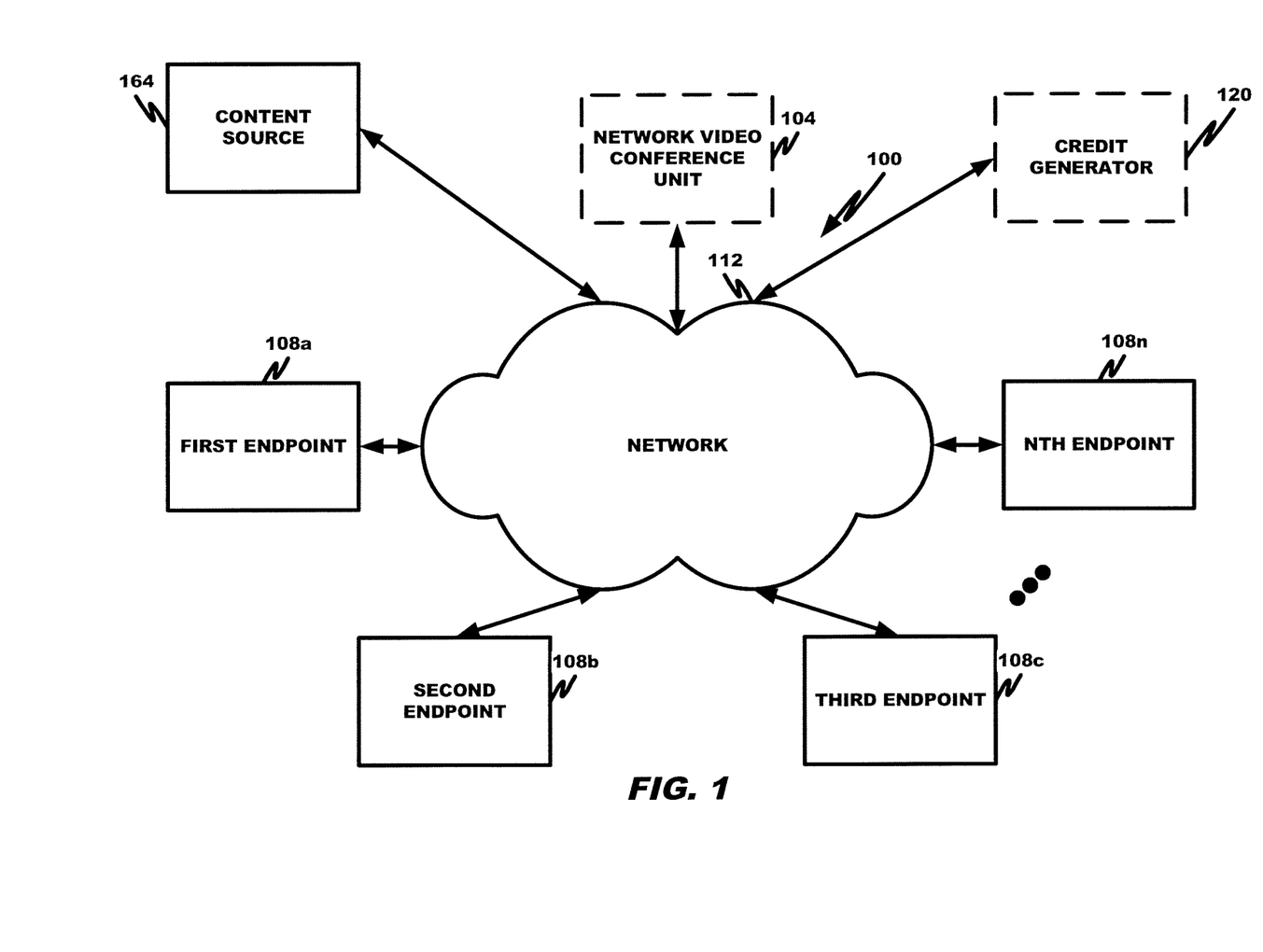
FIG. 1 is a block diagram depicting a system configuration according to an embodiment of the disclosure.

The conferencing system 100 of FIG. 1 generally includes an optional network video conference unit 104, first, second, third, . . . nth endpoints 108a-n, content source 164, and optional credit generator 120, all interconnected by a network 112. While the first and second endpoints 108a,b are depicted, it is to be appreciated that more endpoints can be present and participating in the video conference. The conferencing system 100 can be a personal video conferencing system between two users communicating one-on-one, a multiple user video conferencing system communicating point-to-point (in which case no MCU is required), a group video conferencing system, a mobile video conferencing system involving one or more mobile endpoints and can be a software only solution, hardware only solution, or combination of software and hardware solutions.

The optional network video conference unit 104 can be any network multipoint conferencing unit ("MCU") or video conferencing server ("VCS"). During a multipoint conference session, the MCU can manage multiple endpoints at once, coordinate the video data processing of the multiple endpoints, and forward the flow of media streams among the multiple endpoints. The MCU can conduct group video conferences under the principle of mixing media streams, i.e. mixing and re-encoding participants' video conferencing streams in real time. For example, the MCU can create a picture-in-picture effect. The MCU in most applications includes a multipoint controller ("MC") and optionally one or more multipoint processors ("MPs"). The MCs can coordinate media stream processing parameters between endpoints and typically support the H.245 protocol. The MPs can process, mix and switch multimedia streams.

In contrast, a VCS often implements a multiplexing pattern of the data streams, which implies no transcoding. The VCS typically redirects the media streams of the video conference participants. The compression/decompression and media stream mixing functions are generally performed in the endpoint devices.

The network video conference unit 104 can service any conference topology, including a centralized conference, decentralized conference, or hybrid conference topology. Exemplary video conference units that can be modified as set forth herein include the ELITE 6000™, 6110™, 6120™, 5000™, 5105™, and 5110™ products of Avaya, Inc.

The first, second, third, . . . nth endpoints 108a-n can be any suitable devices for providing a user interface for a voice or video conference. Some of the endpoints can be capable of hosting the voice portion of the conference only or a part of the video conference (e.g., only display images of remote participants but not transmit an image of a local participant or only transmit an image of a local participant but not display images of remote participants) or all of the video conference (e.g., display images of remote participants and transmit an image of the local participant). The first and second endpoints at least capture and optionally display locally to the local participant images of remote participants.

Examples of suitable devices include a cellular phone, tablet computer, phablet, laptop, personal computer, and purpose-built devices, such as the SCOPIA XT EXECUTIVE 240™, XT ENDPOINT™, XT1700™, XT4200™, XT4300™, XT5000™, XT embedded Server™, XT7000, and XT Endpoint™ with embedded server products by Avaya, Inc. that can be modified as set forth herein.

The content source 164 can be any source for selected content. The source can be, for example, an enterprise database containing enterprise-related information (such as employee records, gross and net sales figures, direct and indirect expenses, product information, supplier information, customer information (such as customer identifiers and other customer profile information, electronic addresses, account information, sales history, and customer rating, type, or ranking), and enterprise competitive intelligence (such as market information (e.g., market description and market share) and competitor information).

The content source can be a publicly accessible source of information, such as a web site of a competitor, supplier, customer, news service, social networking web site (such as Facebook™, Twitter™, and Linkedin™), or other type of web site (such as an affiliate website, affiliate agency website, archive site, blog, brand-building site, crowdfunding website, community site, content site, corporate website, e-commerce site, forum website, gallery website, government website, gripe site, gaming website, media-sharing site, news site, personal website, review site, scraper site, search engine site, showcase site, social bookmarking site, Webmail site, Web portal, or Wiki site). The web site can post content of interest or sell contextual advertising either through direct sales or through an advertising network or advertise products or services. As will be appreciated, a web site is a collection of related web pages, including multimedia content, typically identified with a common domain name and published on at least one web server. A web site may be accessible via a public Internet Protocol (IP) network, such as the Internet, or a private local area network (LAN), by referencing a uniform resource locator (URL) that identifies the site. Web pages, the building blocks of websites, are documents, typically composed in plain text interspersed with formatting instructions of Hypertext Markup Language (HTML or XHTML). They may incorporate elements from other websites with suitable markup anchors. Web pages are accessed and transported with the Hypertext Transfer Protocol (HTTP), which may optionally employ encryption (HTTP Secure or HTTPS) to provide security and privacy for the user.

The optional credit generator 120 can be part of a VaaS managed service provider or an advertising service that publishes advertisements of enterprises, an enterprise self-advertising content, a multi-media content provider (such as a broadcaster providing program content), and the like. The optional credit generator 120 can determine credits to an enterprise or private party for permitting advertisements to be presented to the participants during a video conference. The credits can be used to offset the cost charged the enterprise or private party by a VaaS managed service provider. The credits can be determined based on an algorithm that collects information relating to the conference call to determine a value to the advertiser from providing the advertisements from the advertiser. The advertiser pays the managed service provider or enterprise or private party directly for publishing the advertisements to the video conference participants. Factors used to determine credits can include for instance, the duration of displaying the advertising content during the video conference, the manner of displaying the advertising content (e.g., use of a layout which emphasizes or de-emphasizes the content), number and/or geographic locations of participants on the video conference, the identities or hierarchical rankings of the participants in the enterprise, the sales history of the enterprise or private party with the advertiser, the sales results of publishing the advertisement content during the video conference call, and the like. The algorithm can emphasize criteria that indicate an interest by the participants in the advertisement content as opposed to disinterest (apart from a desire to generate credits). A ceiling can be put on the credit that can be earned in any month to offset the VaaS managed service provider charge.

The optional network video conference unit 104 and first, second, third, . . . nth endpoints 108a-n are connected by the network 112. The network 112 can be a local area network ("LAN"), a wide area network ("WAN"), a wireless network, a cable network, a telephone network, the Internet, and/or various other suitable networks in which a video conferencing system can be implemented.

Figure 2:
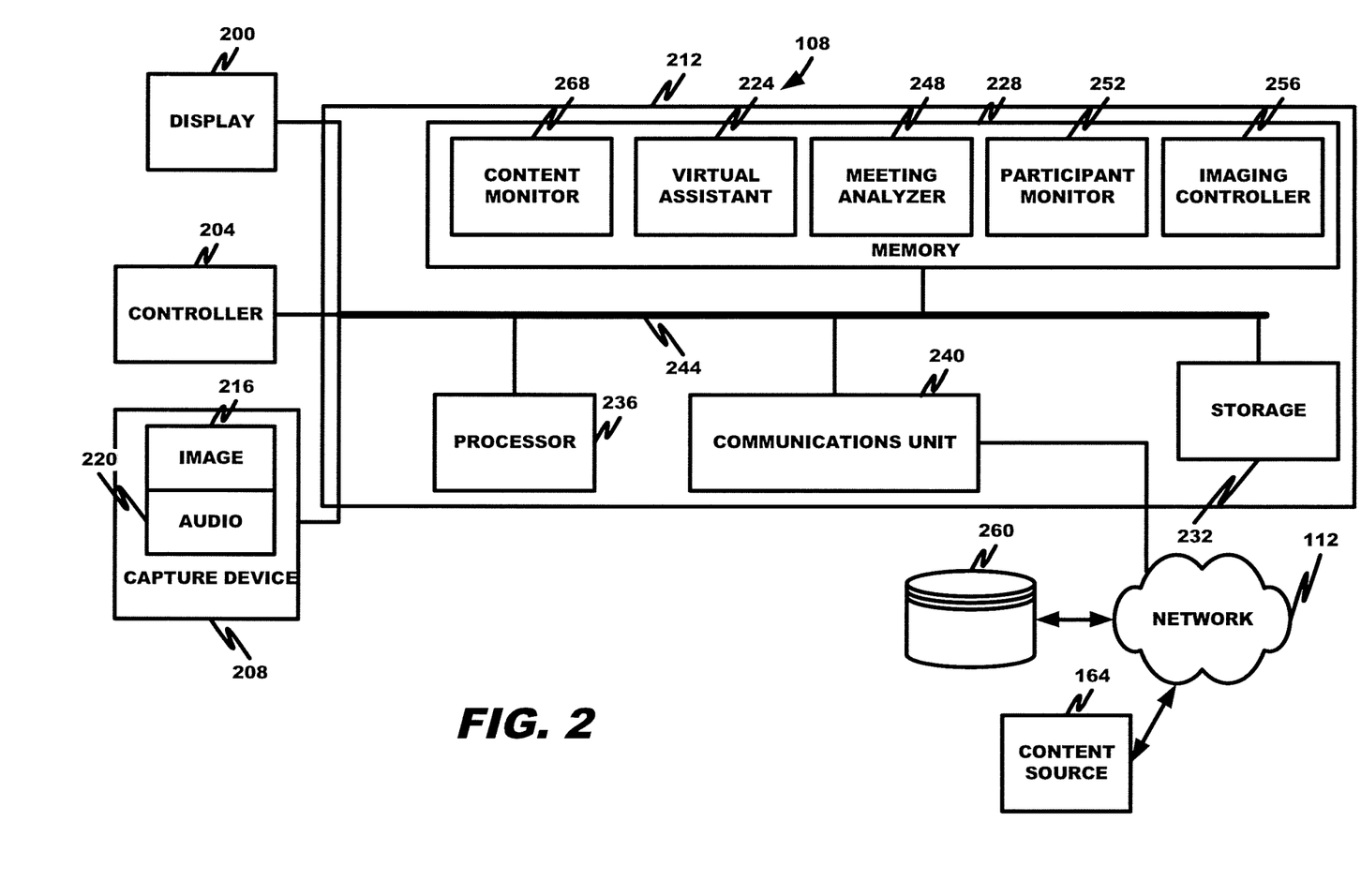
FIG. 2 is a block diagram depicting an endpoint configuration according to an embodiment of the disclosure.

With reference to FIG. 2, an exemplary endpoint is depicted. The exemplary endpoint 108 comprises a display device 200, a controller 204, a capture device 208, and a control unit 212.

The display device 200 can be any appropriate display or screen suitable to display an image stream received from the control unit 212. The display device 200 may display an image stream received at the control unit 212 from one of the remote video conferencing endpoints over the communications network 112. Alternatively, and/or additionally, the image stream received from the image capture device 208 may be displayed by the display device 200 and/or processed by the control unit 212 before transmission to the display device 200.

The controller 204 can be any type of input devices, such as a keyboard, a pointing device (e.g. mouse, trackball, pointing stick, etc.), a remote control unit or a touchscreen device enabling a participant of the video conferencing room to interact with the control unit 212.

The capture device 208 can include an image capturing device 216, such as one or more still or video cameras capable of capturing 2-dimensional or 3-dimensional image information, and an audio capturing device 220, such as one or more microphones. The image capturing device 216 captures and provides image streams to the control unit 212. The image capturing device 216 typically comprises one or more mechanical or digital Pan-Tilt-Zoom (PTZ) cameras. However, those skilled in the art will appreciate that other types of cameras may also be used. The audio capturing device 220 can comprise an array of microphones to capture and provide the audio streams to the control unit 212.

The control unit 212 generally comprises a display screen 224, a memory 228, a storage unit 232, a processor 236 and a communications unit 240. The control unit 212 can communicate (i.e. exchange audio and video information and/or any additional data), over the communications network 112, with the other video conferencing endpoints and the network video conference unit 104, access an enterprise database 260 comprising subscriber information, or interact with the content source 164 (and optional credit generator 120). This display device 200 can provide a command and control interface for the user.

The memory 228 can be any computer readable medium, such as a random access memory (RAM) or other dynamic storage device (e.g. dynamic RAM, static RAM, synchronous RAM, etc.) coupled to the bus 244 for storing information and instructions to be executed by the processor 236.

Additionally, the memory 228 may be used to store temporary variables and/or other intermediate information during the execution of instructions by processor 236. It will be appreciated by those skilled in the art that the memory 228 may be a single memory or split into a plurality of memories. For example, a further memory may be provided such as a read only memory (ROM) or any other static storage (e.g. programmable ROM, erasable programmable ROM, and electrically erasable programmable ROM, etc.) coupled to the bus for storing static information and instructions for the processor 236.

The storage unit 232 can be a further computer readable medium, such as a magnetic hard disk, or a removable media drive (e.g. floppy disc drive, read-only compact disc drive, read/write compact disc drive, compact disc jukebox, tape drive, and removable magneto-optical drive), etc. coupled to the bus for storing other information and/or instructions.

The processor 236 can process any command received from a video conferencing user, triggered by the video conferencing endpoint 108 or received from the communications network 112 (e.g. from the network video conference unit 104 and/or from another video conferencing endpoint 108). In response to a received command, the processor 236 can retrieve and execute the relevant set(s) of instructions from one of the memories 228 and 232. Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture. Those skilled in the art will appreciate that the present disclosure is not limited to this single processor arrangement but that one or more processors in a multi-processor arrangement may be employed to execute the set(s) of instructions retrieved from one of the memories.

Finally, the communications unit 240 is generally a communication interface providing a two-way communication coupling between the video conferencing endpoint 108 and the communications network 112. The communications unit 240 can receive any type of data information from the different devices of the video conferencing endpoint 108 such as the display device 200, the controller 204, and the capture device 208 or the content source 164 and pass the data information to the processor 236 for further processing and/or to other video conferencing endpoints of the video conferencing system 100 over the communications network 112. Also, the communications unit 240 can receive any additional data information received by a further device present in the video conferencing endpoint 108. The communication unit 240 can exchange (e.g. transmit and receive) any suitable type of data information with a plurality of devices coupled to the control unit 212 and exchange information with remote video conferencing endpoints 108 or the network video conference unit 104 of the video conferencing system 100 or with the content source 164 or optional credit generator 120 over the communications network 112.

Referring to FIG. 2, included in the memory 228 of the control unit 212 are a content monitor 268, virtual assistant 224, meeting analyzer 248, participant monitor 252, and imaging controller 256.

The participant monitor 252 can acquire the facial images of each participant in the captured image using face detection techniques, acquire other object images in the captured image (such as a whiteboard, table, chair, and the like) using digital processing techniques, determine an identity of each acquired facial image by face recognition techniques using an identified biometric information of the participant, determine an active speaker using speaker localization and a microphone array, determine a point of focus of one or more participants in the room by gaze detection, or the like. The participant monitor 252, using face detection techniques, microphone array analysis, or motion detection, can detect a participant entering or leaving the monitored communication session area, e.g., room.

The content monitor 268 automatically monitors content, such as speech, presentation documents, chat and other textual communications, whiteboards, to determine an object of interest to the participants. In some applications, the display layout used for displaying local objects of interest (such as active speaker, simultaneous view of most of the local participants, or presentations) to remote participants includes a chat box or field to receive participant requests or commands, inter-participant communications, communications with persons other than a participant, and the like). For example, the chat box can include a textual communication between participants, a URL of a network accessible web site or other web resource, textual communication between one or more participants and a human or artificially intelligent machine or bot or a contact center, and the like. It can be either a private conversation between a subset of participants or a public conversation among all participants.

The meeting analyzer 248 can analyze by context analytics input from the participant monitor 252 and content monitor 268 and other information to determine an initial and in-progress focal point of the meeting for use by the virtual assistant 224. The meeting analyzer 248 typically considers various types of information sources in the initial and in-progress focal point determination. Information can be personal information from one or more participants (such as input from the participant monitor (e.g., the identity, business-related analytics such as title, expertise, or other business characteristic or metric of a participant), social network or enterprise participant profile, residence, position in enterprise, socioeconomic status, electronic calendars, and other personal information), data used in content analytics or results of content analytics with virtual assistant actions taken in prior video conferencing sessions, and the like. For example, the meeting analyzer 248 can access, via the enterprise database 260, electronic calendars of one or more participant subscribers to determine, from the Outlook™ meeting invitation, the meeting parameters (e.g., beginning and ending times, meeting duration, meeting attendee identities and locations, meeting attendee contact information (e.g., electronic addresses), identity of meeting organizer, enterprise hierarchy (or office or position) of the meeting participants, meeting subject, meeting agenda from the meeting notes, and meeting presentations or discussion topics from the attachments). The meeting analyzer 248 can access, via an email server as the content source 164, pre-meeting email threads among the communication devices of the participants regarding the meeting. Based on this information, the meeting analyzer 248 can employ natural language processing to determine, for instance, the organization or agenda of the meeting, such as who will be presenting or speaking, during what time interval, and about what topics, when the meeting is open for questions from other participants, and the like.

The virtual assistant 224 is an automated artificially intelligent device, such as a bot, software agent (a computer program that acts for a user or other program in a relationship of agency), intelligent agent (in particular exhibiting some aspect of artificial intelligence e.g., learning and reasoning), autonomous agent (capable of modifying the way in which it achieves its objectives), distributed agent (with parts of the agent being executed on physically distinct computers), multi-agent system (using distributed agents that do not have the capabilities to achieve an objective alone and thus must communicate), or mobile agent (an agent that can relocate its execution onto different processors). The device can be a software application that runs automated tasks (e.g., scripts). The virtual assistant 224 can perform tasks that are both simple and structurally repetitive or complex and not repetitive. The virtual assistant 224 can communicate with participants through conversational and synthetic speech or text, such as locally via text messages or remotely via instant messaging (IM), Internet Relay Chat (IRC), or another web interface such as Facebook™ Bots and Twitterbots™. The virtual assistant can allow participants to ask questions in plain English and then formulate a proper response. The virtual assistant 224 can handle many tasks, including retrieving content from the content source or enterprise database 260 (such as information of interest (e.g., news, advertising content, business information of the enterprise, and the like)). An additional role of the virtual agent 224 can be to lurk in the background of a conversation channel, commenting on certain phrases uttered by the participants (such as based on pattern matching).

The virtual assistant 224 can take many forms, such as a chat bot that interacts with one or more participants through the chat box, a graphically rendered avatar appearing in a designated portion of the display 200 in the local and remote endpoints, a synthetically generated voice played through speakers in the local and remote endpoints, a video or content retrieval agent, and the like.

Various examples can illustrate the role of the virtual assistant 224. In a first example, the virtual assistant 224 monitors the audio and textual channels of the videoconferencing session, such as using speech-to-text translation and key word spotting or word cloud monitoring techniques. When certain words or phrases are recognized, the virtual assistant 224, based on template matching or rules, determines that a certain action is to be performed. The action can be, for instance, retrieving advertising content from the content source 164 about a product or service or other subject matter of interest to the participants (e.g., open a web browser and retrieve a web page of interest, retrieve and present a video clip, etc.), business performance information about a product or service offered by the enterprise from the enterprise database 260, making a reservation for travel or entertainment or a business appointment, joining a participant (such as another employee, a subject matter expert, or representative of another enterprise) to the video conferencing session, provide a recommendation to the participants based on prior behavior or preferences of one or more of the participants or nonparticipants, review of a previous interaction, such as an email exchange, teleconference, or video conferencing session involving one or more of the participants, and the like. The virtual assistant can maintain historical records of behavior for one or more participants to enable it to service better the needs of the participants during later video conferencing sessions (e.g., remind the participants about topics discussed previously by all or a subgroup of the participants in a video conferencing session). Stated differently, the virtual assistant maintains, over time, a user profile for each participants and a group profile for the group of participants that includes behavior descriptions, topics discussed, preferences, and the like. In a second example, the virtual assistant 224 behaves as a participant to the video conferencing session. The virtual assistant 224 can speak actively during the video conferencing session in response to questions, make an informational video, text, audio or multimedia presentation (e.g., play a video, make a PowerPoint™ presentation, etc.) to the participants, and the like. The virtual assistant 224, unlike a human participant, can override the graphical display layout selected by the imaging controller 256 in favor of a layout selected by the virtual assistant 224. For example, the imaging controller 256 may select a first layout or layout configuration for the participants and/or virtual assistant with different participants displayed in different frames or fields of the layout, and the virtual assistant 224, in response to contextual analysis, can override the first layout or layout configuration by a different second layout or layout configuration displaying only one frame or an enlarged frame for content provided by the virtual assistant 224. When no human participant is speaking for a selected period of time, the virtual assistant 224 can become the active speaker and provide content deemed to be of interest to the participants. In another example, the virtual assistant 224, like a human participant, is assigned follow up actions to be performed after the video conferencing session, such as retrieving and distributing by a communication modality, such as email or texting, content requested by or deemed to be of interest to one or more participants. In another example, the imaging controller 256 retains control of layout selection or configuration while the virtual assistant 224 is given exclusive control of a frame or field within the selected layout. In another example, the virtual assistant 224 takes different presentation modes or forms during different parts of a common video conferencing session. In a first part of the video conferencing session, the virtual assistant 224 can be a chat box, in a second part, the virtual assistant can be an avatar displayed on the display 200, and in a third part of the video conferencing session, the virtual assistant 224 can be a synthetically generated voice without any associated graphical representation in the layout or display. The mode selected may depend on the results of the contextual analysis.

The imaging controller 256 can determine, based on rules and user input, which image(s) should be provided to remote participant endpoints at any point in time during the communication session and an appropriate layout or layout configuration.

Figure 3:
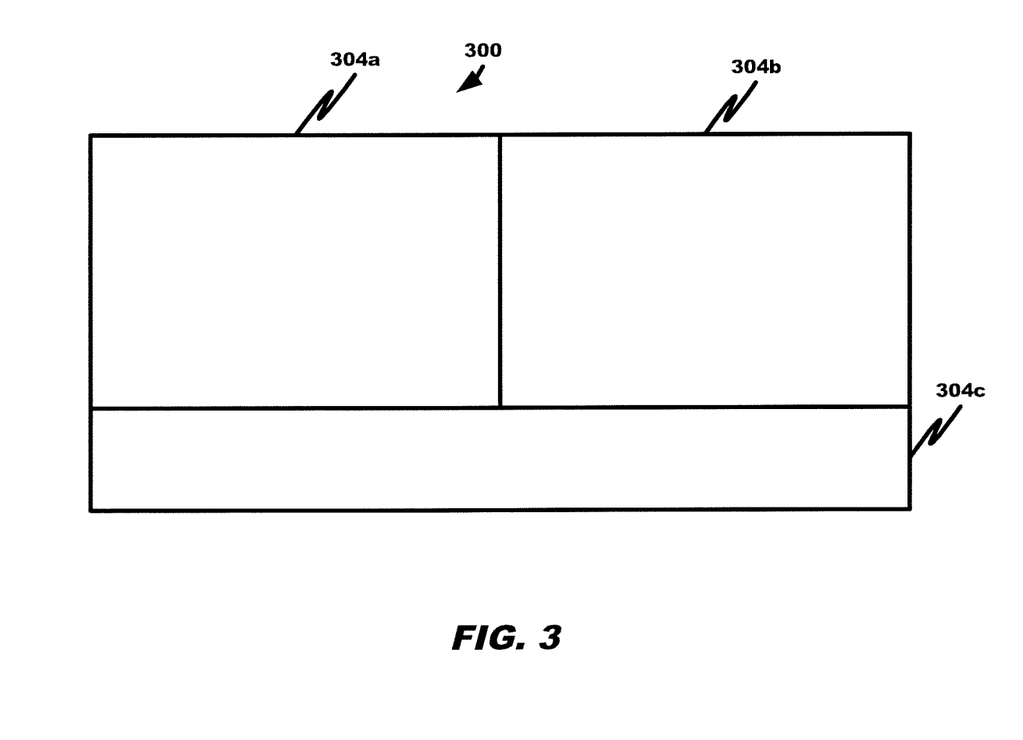
FIG. 3 depicts a layout for a video conferencing display according to an embodiment.

An exemplary display layout 300 is depicted in FIG. 3. The layout 300 includes first, second, and third frames 304*a-c*. A layout can include any number of frames. In one configuration, the first and second frames 304*a* and 304*b* depict images of participants, such as active speakers, while the third frame 304*c* contains a robotic avatar for displaying textual messages between participants to or from the virtual assistant 224. The robotic avatar can be public or private. A participant can communicate privately with the virtual assistant or vice versa. A participant can also communicate publicly with the virtual assistant, and the virtual assistant can communicate publicly with all of the participants.

Figure 7:
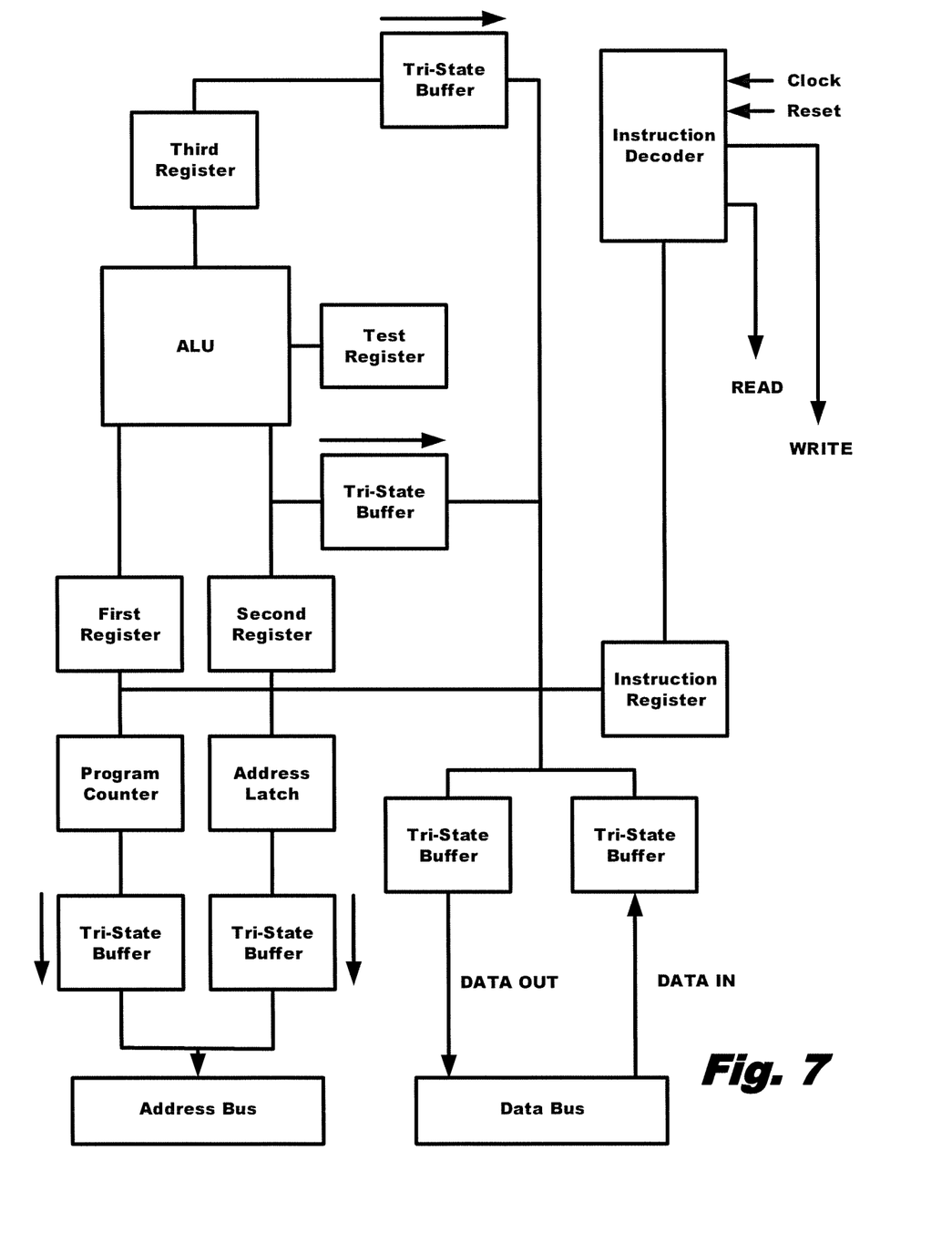
FIG. 7 is a block diagram of hardware for the control unit according to an embodiment

With reference to FIG. 7, the control unit 212 can execute the content monitor 268, virtual assistant 224, meeting analyzer 248, participant monitor 252, and imaging controller 256 using an arithmetic/logic unit ("ALU"), which performs mathematical operations, such as addition, subtraction, multiplication, and division, machine instructions, an address bus (that sends an address to memory), a data bus (that can send data to memory or receive data from memory), a read and write line to tell the memory whether to set or get the addressed location, a clock line that enables a clock pulse to sequence the processor, and a reset line that resets the program counter to zero or another value and restarts execution. The arithmetic/logic unit can be a floating point processor that performs operations on floating point numbers. The control unit 212 further includes first, second, and third registers that are typically configured from flip-flops, an address latch, a program counter (which can increment by "1" and reset to "0"), a test register to hold values from comparisons performed in the arithmetic/logic unit, plural tri-state buffers to pass a "1" or "0" or disconnect its output (thereby allowing multiple outputs to connect to a wire but only one of them to actually drive a "1" or "0" into the line), and an instruction register and decoder to control other components. Control lines, in the control unit 108, from the instruction decoder can: command the first register to latch the value currently on the data bus, command the second register to latch the value currently on the data bus, command the third register to latch the value currently output by the ALU, command the program counter register to latch the value currently on the data bus, command the address register to latch the value currently on the data bus, command the instruction register to latch the value currently on the data bus, command the program counter to increment, command the program counter to reset to zero, activate any of the plural tri-state buffers (plural separate lines), command the ALU what operation to perform, command the test register to latch the ALU's test bits, activate the read line, and activate the write line. Bits from the test register and clock line as well as the bits from the instruction register come into the instruction decoder. The ALU executes instructions for the content monitor 268, virtual assistant 224, meeting analyzer 248, participant monitor 252, or imaging controller 256.

Figure 4:
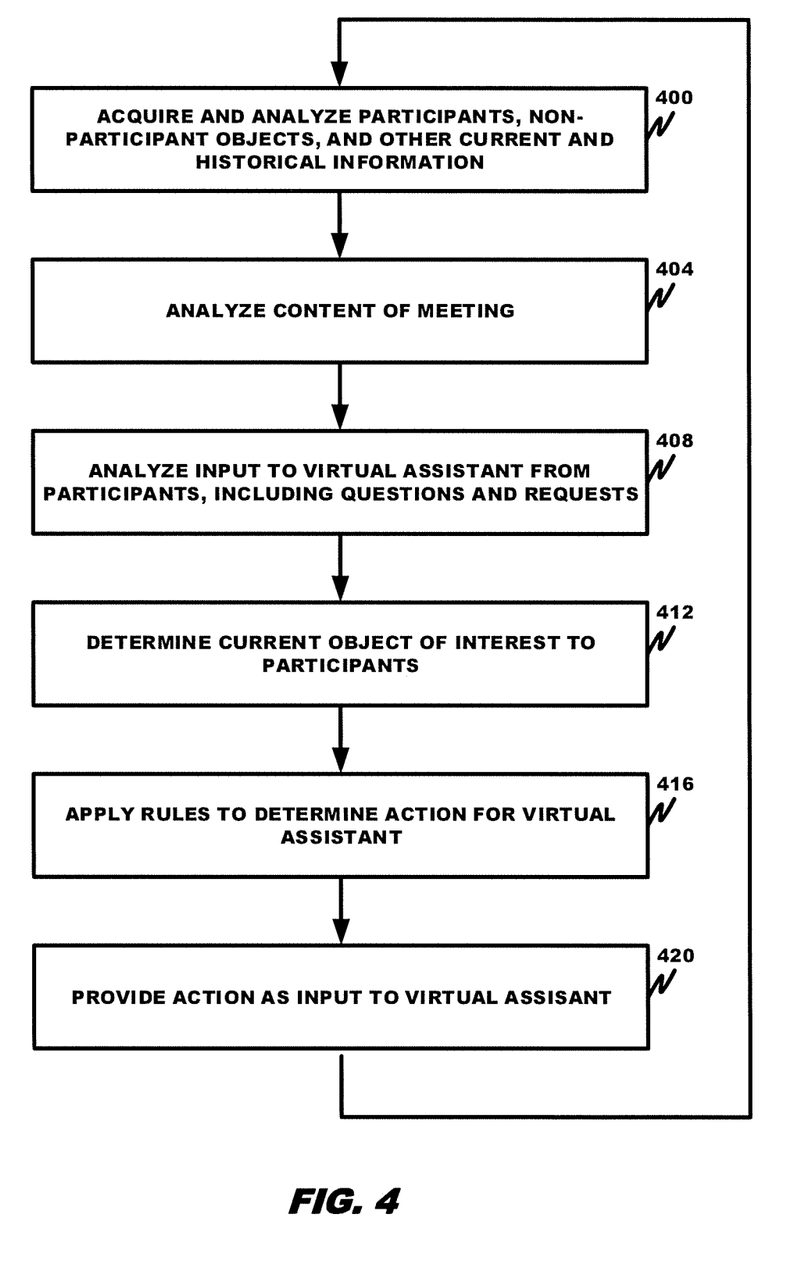
FIG. 4 is a flow chart according to the embodiment.

The operation of the control unit 212 will now be described with reference to FIGS. 2 and 4.

In steps 400 and 404, the participant monitor 252, content monitor 268, and/or meeting analyzer 248 acquire and analyze participants and non-participant objects of interest in the monitored area for the communication session and/or at remote areas monitored by other nodes to the video conferencing session and other current and historical information. The participant monitor 252 can determine where participants are seated, a facing direction of each participant, an identity of each participant, what objects are in the room (such as whiteboard, table, and projector screen), and whether there are participants seated outside the field of view of the camera. The participant monitor 252 can further determine whether there have been participant changes since the last image acquisition and analysis. Participant changes, for instance, include a new participant entering the room, a participant leaving the room, a participant moving to a seating location outside the field of view of the image capture device, and a new active speaker. The identity and position of the active speaker and other participants can be determined by image processing and/or by a microphone array. The content monitor 268 can identify key words or phrases in the audio and/or textual communications exchanged by participants, whether publicly or by a private side channel, and the meeting analyzer 248 can acquire from the enterprise database 260 historical information related to the participants, prior interactions between the participants (such as prior video conferencing or telecommunication sessions), and/or the current video conferencing session (such as the topology of the session and information from the underlying meeting invitation or email thread leading up to the session).

In one configuration, the meeting analyzer 248 analyzes the meeting, communication session topology, and presentation context. The meeting analysis typically includes, for instance, analysis of the electronic calendars and email threads of one or more participant subscribers to determine the meeting parameters, and the presentation contextual analysis includes, for example, key word identification to identify, by speech-to-text and natural language processing of the communication session conversation, the current context of the meeting. The communication session topology refers to the electronic addresses, capabilities, and preferences of the endpoints 108 to the communication session and the network video conference unit 104.

In step 408, the content monitor 268 analyzes input to the virtual assistant from participants, including questions, commands, and requests. The input can be by text entered into the chat box, words or phrases addressed to the virtual assistant and spoken during the session, selection or activation of a video frame or subframe, selecting a link, and/or by body gestures (e.g., hand gestures) detected by image processing.

In step 412, the meeting analyzer 248 analyzes the information collected during steps 400, 404, and 408 and determines a current object(s) of interest to the participants, and, in step 416, applies rules to determine an action to be performed by the virtual assistant.

In step 420, the meeting analyzer 248 provides the action(s) to the virtual assistant.

Figure 5:
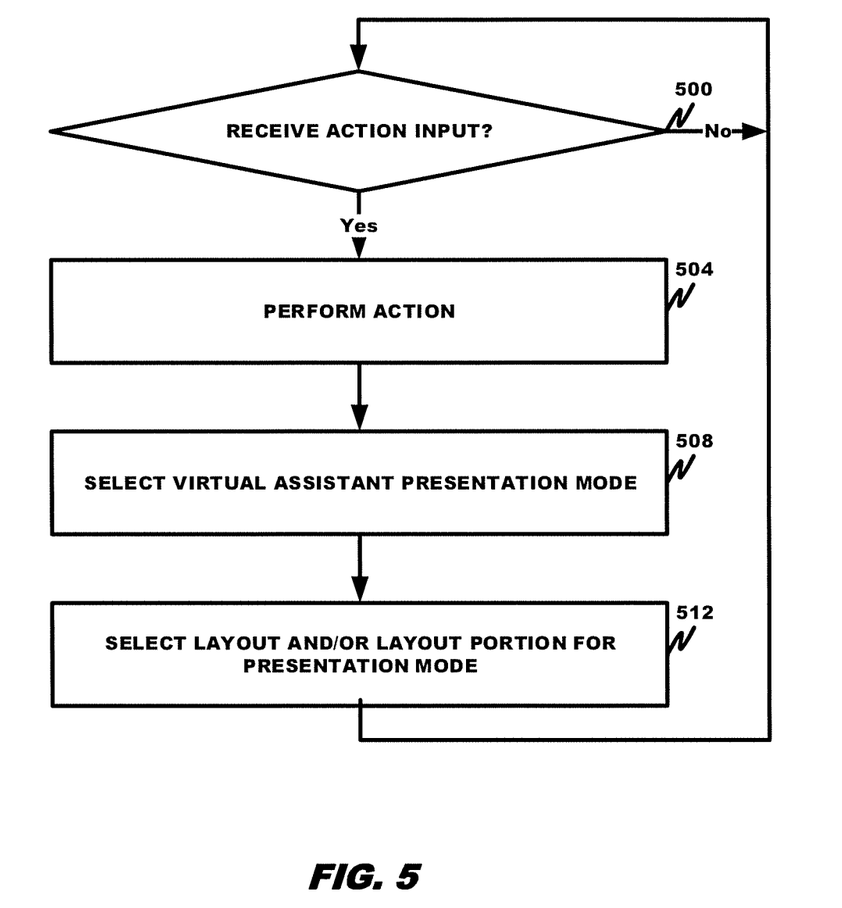
FIG. 5 is a flow chart according to the embodiment.

Referring now to FIG. 5, the virtual assistant, in decision diamond 500, determines whether or not it has received input, regarding an action to be performed, from the meeting analyzer 248. If no input is received, the virtual assistant returns to and repeats decision diamond 500. When input is received, the virtual assistant proceeds to step 504.

In step 504, the virtual assistant performs the action.

In step 508, the virtual assistant selects a virtual assistant presentation mode to provide participants the results of the performed action.

In step 512, the virtual assistant selects real estate (e.g., a layout or layout portion or configuration or chat box or the like) for the selected presentation mode.

Figure 6:
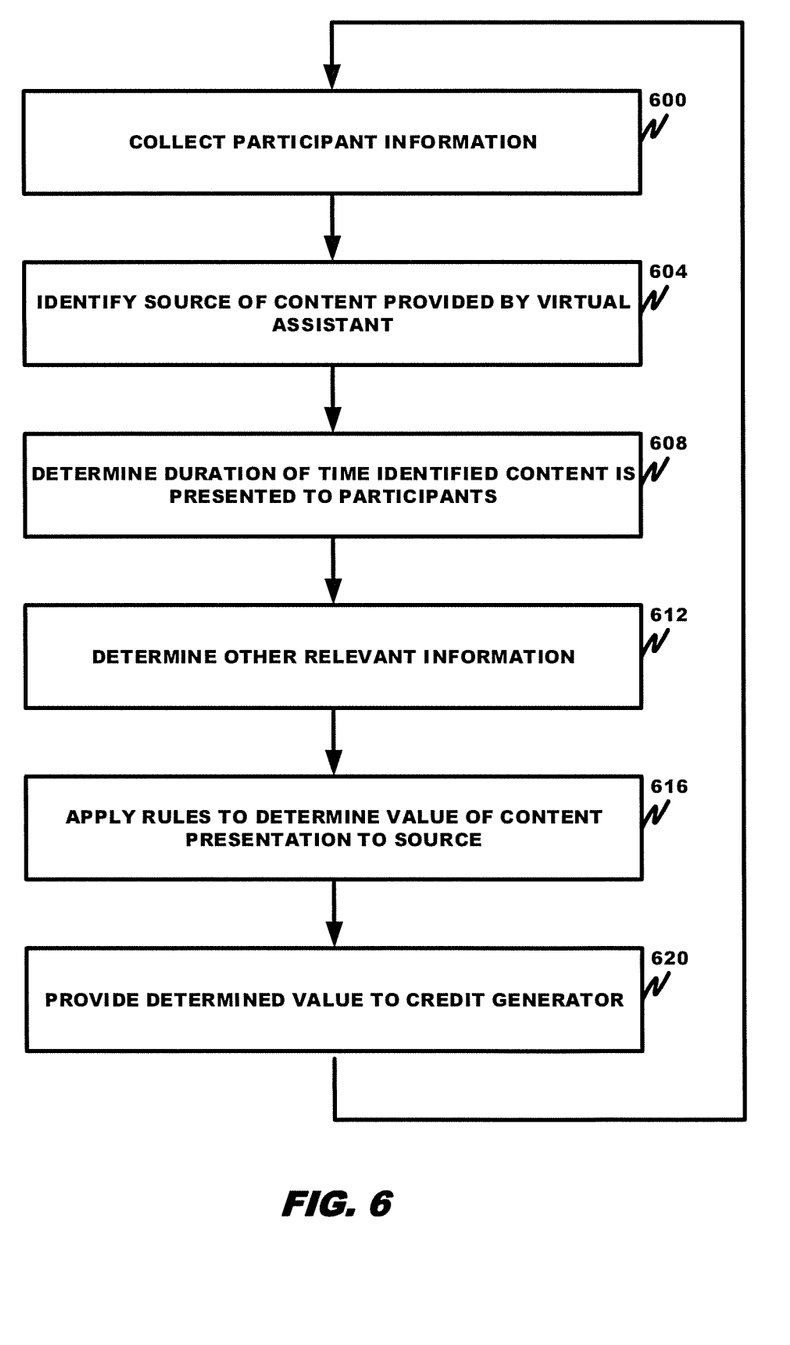
FIG. 6 is a flow chart according to the embodiment.

The optional process for determining credits will now be discussed with reference to FIG. 6. The algorithm can determine credits based upon a perceived value of the opportunity to present the advertising content to the participants during the video conferencing session.

In step 600, the participant monitor 600 collects participant information as discussed with reference to step 400. More conference participants and/or at more discrete node locations can cause a higher amount of credits to be awarded as compared to fewer participants at fewer node locations In step 604, the meeting analyzer identifies the source of advertising content provided to participants by the virtual assistant.

In step 608, the meeting analyzer determines the duration of time that the identified advertising content is presented to the participants during the video conferencing session. Longer time durations can cause a higher amount of credits to be awarded as compared to lesser time durations.

In step 612, the meeting analyzer determines other relevant information, such as whether a representative or web site of the advertising content source was contacted for further information during or after the session, prior sales history of the enterprise with the source, subsequent sales of the enterprise with the source particularly relating to the advertising content, an areal size of the frame or subframe devoted to display of the advertisement content, a presentation mode for the advertisement content, and the like. A higher credit can be awarded for a representative or web site of the advertising content source being contacted for further information during or after the session, a substantial prior sales history of the enterprise with the source, and/or subsequent sales of the enterprise with the source particularly relating to the advertising content.

In step 616, the meeting analyzer applies rules to determine a value of the content presentation to the source. Rules can set a limit on the possible value attainable for the enterprise.

In step 620, the meeting analyzer provides the determined value to the credit generator to determine an appropriate credit to be awarded.

Any of the steps, functions, and operations discussed herein can be performed continuously and automatically.

The exemplary systems and methods of this disclosure have been described in relation to video conferencing communication sessions. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a server, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, MCU, in one or more communications devices, at one or more users' premises, other devices, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In one embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   acquiring, by a processor of a control unit, content during a communication session;
   monitoring, by the processor, the content during the communication session;
   sensing, by the processor, a context within the content; and
   automatically performing, by the processor, an action in response to the context, wherein the action is performed at a time automatically determined by the processor, and wherein the time is based on the action and is based on the context.

2. The method of claim 1, wherein the sensed context is a prior action performed by the processor in response to a prior sensed context of a prior communication session.

3. The method of claim 1, wherein the context comprises an electronic address, wherein the action comprises providing advertising content to at least one participant of the communication session based on the electronic address, and wherein the advertising content is at least one of: injected into a chat area of the communication session, and embedded, with a partial transparency, into a video stream of the communication session.

4. The method of claim 1, wherein the action is to access content of a personal email of at least one participant of the communication session, and further comprising determining, by the processor, a meeting parameter from the personal email.

5. The method of claim 1, wherein the action is determining a layout configuration to display to each participant of the communication session during the communication session based on the context, and wherein the layout configuration includes multiple frames, wherein at least one of the frames has a different type of content than another of the frames.

6. The method of claim 5, wherein the different type of content comprises an avatar that is not representative of any participants of the communication session.

7. The method of claim 1, wherein the action is to provide content relevant to a participant of the communication session, and; further comprising: sensing, based on a second context, a second time to present a second content, and presenting the second content during the second time, wherein the content and the second content are each advertising content.

8. The method of claim 7, wherein the second context is an amount of conversation during the communication session.

9. The method of claim 1, wherein the communication session has at least three participants, and wherein the content is video content and the context is sensed based on an image within the video content.

10. The method of claim 1, wherein the action comprises providing content to at least one participant of the communication session, and wherein the content enables reaching out to a representative for further information about the content.

11. A communication system, comprising:
    a control unit, comprising:
    a computer readable medium; and
    a processor coupled with a camera,
    wherein the camera acquires an image during a video communication session; and
    the computer readable medium comprises instructions that cause the processor to automatically perform an action in response to a context sensed from the image during the video communication session, wherein the action is performed at a time automatically determined by the processor, and wherein the time is based on the action and is based on the sensed context.

12. The communication system of claim 11, wherein the action is to access content of interest to at least one participant of the video communication session, wherein the content of interest is determined based on the context sensed from the image during the video communication session.

13. The communication system of claim 11, wherein the action is to schedule an event involving at least one participant of the video communication session.

14. The communication system of claim 11, wherein the communication system maintains historical records of each participant of the video communication session, and wherein the action provides a service to at least one participant based on the sensed context and the historical records.

15. The communication system of claim 14, wherein the action is providing advertising content to the at least one participant, and wherein the advertising content is selected using the historical records.

16. The communication system of claim 11, wherein the image is either a still frame or a video frame, wherein the context sensed is during the video communication session, and wherein the email is determined based on a result of a recognition algorithm processing the context sensed.

17. The communication system of claim 16, wherein a virtual assistant presents visual content of interest during the video communication session based on the sensed context.

18. The communication system of claim 11, wherein the sensed context is an identity of at least one participant of the video communication session, and wherein the action is providing advertising content to the at least one participant during the video communication session, wherein the advertising content is based on the identity of the at least one participant of the video communication session, and wherein the advertising content is an entirety of a single frame within a set of frames displaying participants of the video communication session.

19. The communication system of claim 11, wherein the context is an identity of at least one participant of the video communication session, and wherein the action is providing advertising content to the at least one participant during the video communication session, wherein the advertising content is based on the identity, and wherein the advertising content is an entirety of a single frame within a set of frames displaying participants of the video communication session.

20. A method, comprising:
acquiring, by a camera coupled with a processor of a control unit, an image during a video communication session, and
automatically performing, by the processor executing instructions on a computer readable medium, an action in response to a context sensed from the image during the video communication session,
wherein the action is performed at a time automatically determined by the processor, and wherein the time is based on the action and is based on the sensed context.

* * * * *